(12) United States Patent
Liao

(10) Patent No.: US 8,364,299 B2
(45) Date of Patent: Jan. 29, 2013

(54) AUDIO SIGNAL TRANSMISSION APPARATUS AVOIDING NOISE GENERATION AND METHOD THEREOF

(75) Inventor: Jung-Fu Liao, Taipei (TW)

(73) Assignee: C-Media Electronics Inc., Taipei (TW)

( * ) Notice: Subject to any disclaimer, the term of this patent is extended or adjusted under 35 U.S.C. 154(b) by 521 days.

(21) Appl. No.: 12/644,522

(22) Filed: Dec. 22, 2009

(65) Prior Publication Data

US 2011/0014980 A1 Jan. 20, 2011

(30) Foreign Application Priority Data

Jul. 20, 2009 (TW) ................................. 98124393 A

(51) Int. Cl.
*G06F 17/00* (2006.01)
(52) U.S. Cl. ........................................................ 700/94
(58) Field of Classification Search .................... 700/94; 381/71.1–71.14, 94.1–94.9
See application file for complete search history.

(56) References Cited

U.S. PATENT DOCUMENTS

2007/0189508 A1* 8/2007 Knutson et al. .......... 379/406.08

* cited by examiner

*Primary Examiner* — Andrew C Flanders
(74) *Attorney, Agent, or Firm* — Rosenberg, Klein & Lee

(57) ABSTRACT

An audio signal transmission apparatus avoiding noise generation is applied to a game platform functions by executing a recording process, and comprises: an analog-to-digital converter, an intermediary processing unit, a counter, and a controlling unit. The analog-to-digital converter is used for converting an analog audio signal to a first digital audio signal. The intermediary processing unit is connected with the analog-to-digital converter for transmitting the first digital audio signal. The counter controls the intermediary processing unit to output the first digital audio signal after counting a specific time. The controlling unit, connected with the counter and the intermediary processing unit, is used for transmitting the first digital audio signal to the game platform. Therefore, the present invention can achieve the purpose for avoiding noise generation when the audio signal transmission apparatus plugs into the game platform.

19 Claims, 4 Drawing Sheets

AUDIO SIGNAL TRANSMISSION APPARATUS AVOIDING NOISE GENERATION AND METHOD THEREOF

BACKGROUND OF THE INVENTION

1. Field of the Invention

The present invention generally relates to an audio signal transmission apparatus; in particular, the present invention relates to an audio signal transmission apparatus avoiding noise generation and is applicable to the game platform as well as method thereof.

2. Description of Related Art

As modern technologies advance, the industry of game machines (electronic entertainment devices) incessantly grows and innovates. In addition to significant progresses in terms of hardware performance, the designs in software games are also becoming more and more diversified and exquisite so as to present the audio/video with even higher quality and richer game contents to attract consumers' attention. Furthermore, since various types of game software are getting more vivid and abundant, peripheral devices interoperating with the game machines have to be conjunctively developed and designed in order to meet the operation requirements of the game software. For example, the recently developed body-sensed game machine can identify the actions made by the player through its wireless operation rod by means of action sensors for game playing. Such brand new body-sensing operations allow many non-conventional players (e.g., women, aged people etc.) to play the games with ease, and achieve the effect in whole body movement.

Furthermore, if the game software is designed with audio-recording function, causing the player to interact with the game inevitably through the use of microphone, the game machine needs to be further equipped with the audio signal transmission apparatus for the reception of analog audio signals. Herein the audio signal transmission apparatus is mostly designed as externally plug-in, and thereby connecting to the game machine via a specific transmission interface (such as most commonly used Universal Serial Bus (USB)) so as to undergo necessary signal conversions and transmission. Such a device is generally referred as the "audio USB dongle".

However, certain drawbacks still exist in the audio signal transmission apparatus applied on the currently available game machine; while the game machine is powered on and operated under the game software enabling the audio-recording function, users plug the audio signal transmission apparatus into the game machine, noises may be accordingly generated. The undesirable noise generation is annoying for users. Therefore, it is needed to devote more efforts in the field to effectively resolve such a problem for improvement.

SUMMARY OF THE INVENTION

In view of the aforementioned objectives, the technical issue that the present invention intends to resolve is to allow the analog-to-digital converter in the audio signal transmission apparatus operating at the correct reference voltage within sufficient time according to the design in time delay. In this way, the problem of noise generation caused by incorrect audio signals played on the game platform, due to the incorrect audio signals output from the analog-to-digital converter which is unable to reach its stable state simultaneously when the audio signal transmission apparatus initializes and operates associated with the retrieval of electrical power, can be accordingly resolved.

To resolve the aforementioned problem, a solution according to the present invention provides an audio signal transmission apparatus avoiding noise generation, in which the apparatus can be applied to a game platform executing a recording process. The audio signal transmission apparatus comprises: an analog-to-digital converter, an intermediary processing unit, a counter, and a controlling unit. Herein the analog-to-digital converter receives an analog audio signal and converts the analog audio signal to a first digital audio signal. The intermediary processing unit is connected with the analog-to-digital converter for transmitting the first digital audio signal. The counter is connected with the intermediary processing unit and generates a control signal to output the first digital audio signal after counting a specific time for delay. Finally, the controlling unit is connected with the counter and the intermediary processing unit, and used for transmitting the first digital audio signal to the game platform.

To resolve the aforementioned problems, another solution according to the present invention provides a method for avoiding noise generation which is used to prevent the generation of noise when an audio signal transmission apparatus is connected with a game platform executing a recording process. The method comprises the following steps: initially, activating the audio signal transmission apparatus, and acquiring the connection between the game platform and the audio signal transmission apparatus; next, delaying for a specific time and further acquiring a digital audio signal in accordance with a recording command.

Thus, the effects offered by the present invention are that, there is no need to significantly increase manufacture costs to eliminate the noise problem due to inconsistency of execution time sequences between software and hardware incorporated on the game platform, thereby allowing the audio signal transmission apparatus connected with the game platform, to successfully output the audio signal converted by the analog-to-digital converter under a stable state, so as to effectively achieve the objective for avoidance of noise generation.

The aforementioned summary as well as the detailed descriptions and appended drawings hereinafter are all of the purpose for further explaining approaches, means and effects taken by the present invention to achieve the prescribed objectives. Other goals and advantages related with the present invention will be also set forth in the following texts and diagrams.

DETAILED DESCRIPTION OF THE PREFERRED EMBODIMENTS

The audio signal transmission apparatus according to the present invention can be conjunctively applied to a game platform, such that the game platform can not only execute games through various original manipulating devices (e.g., joystick, shooting device, driving wheel and the like), but meet the requirements of the recording function over game software, thereby allowing the player to interact with the game software via audible approach. Besides, through the time delay design of the present invention, the analog-to-digital converter in the audio signal transmission apparatus is allowed to have sufficient time to operate stably when the audio signal transmission apparatus is connected with the game machine and powered on. It is possible to prevent that the game platform outputs incorrect audio signals for generating noise due to the analog-to-digital converter fails to reach a stable state simultaneously.

It is further noted that, depending on various game types, the game platform can be generally categorized into TV game machine, handheld game machine and Personal Computer (PC). Among such types of machines, in accordance with the game software enabling recording function, especially, the TV game machine and the handheld game machine, connected with the audio signal transmission apparatus, are more susceptible to the situation of noise generation.

Furthermore, the transmission interface between the audio signal transmission apparatus according to the present invention and the game platform adopts the serial transmission protocols and is allowable for the hot-plug operation. In practical applications, it may be for example a Universal Serial Bus (USB), an IEEE 1394 serial bus, an external Serial Advanced Technology Attachment (eSATA) and the like. For exemplary purposes, the following embodiments of the present invention adopt the USB transmission protocol for illustrations.

Figure 1:
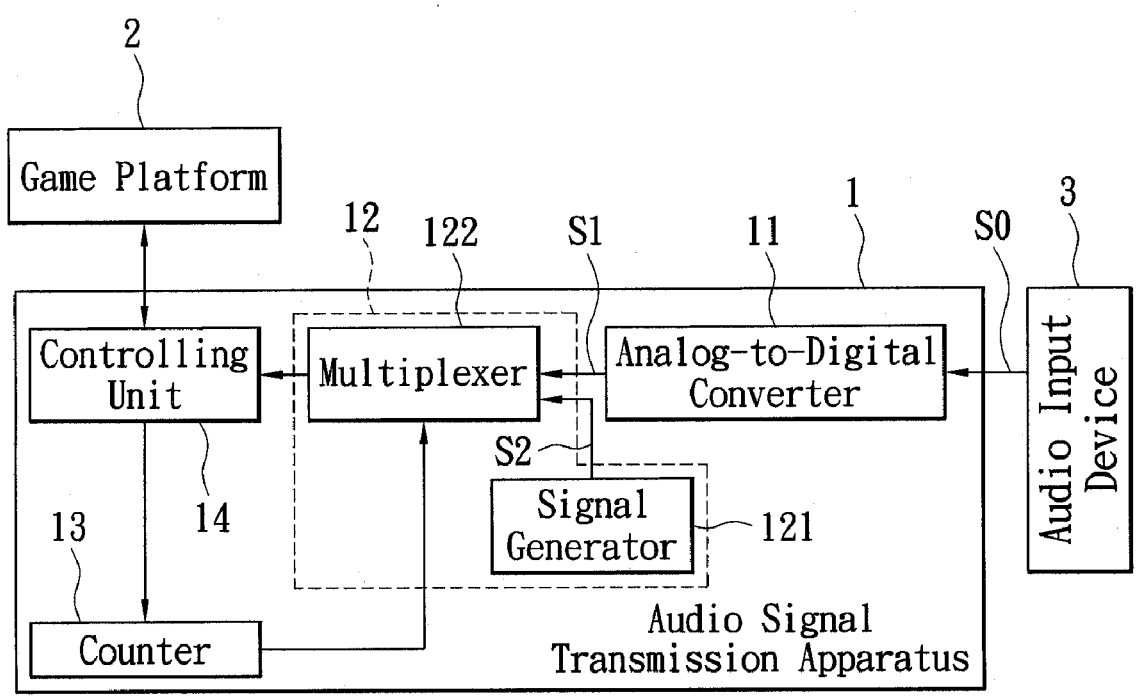
FIG. 1 is a block diagram for an embodiment of the audio signal transmission apparatus avoiding noise generation according to the present invention.

Refer to FIG. 1, wherein a block diagram for an embodiment of the audio signal transmission apparatus avoiding noise generation according to the present invention is shown. As shown in the FIG. 1, the present embodiment provides the audio signal transmission apparatus 1 which is connected with a game platform 2 executing a recording process, and with an audio input device 3 to receive sound made by players. In the way, when a game software (not shown) on the game platform 2 executes the recording process and thus generates a record command, the audio signal transmission apparatus 1 transfers the acquired sound to the game platform 2, thereby allowing the game software to continue to carry on. Herein the audio input device 3 may be for example a microphone, and in design the audio input device 3 may also be directly built in the audio signal transmission apparatus 1 without any restrictions.

The audio signal transmission apparatus 1 comprises: an analog-to-digital converter 11, an intermediary processing unit 12, a counter 13 and a controlling unit 14. Herein the analog-to-digital converter 11 is connected with the audio input device 3 so as to convert the analog audio signal S0 generated from the reception of player's voice into a first digital audio signal S1. The controlling unit 14 communicates with the game platform 2 through the serial transmission protocol for signal transmissions.

Additionally, any person skilled in the relevant art can appreciate that the analog-to-digital converter 11 needs a reference voltage level in practice, and the signal conversions performed at such a reference voltage level can then be considered as the signal conversion under a stable condition, thereby acquiring the correct audio signal. For circuit implementations thereof, the required reference voltage level is associated with a capacitor design. In other words, when the audio signal transmission apparatus 1 is connected with the game platform 2, the audio signal transmission apparatus 1 starts to operate and begins to charge the capacitor with power supply. Until the charging process is finished, it indicates the analog-to-digital converter 11 has reached its stable condition.

The intermediary processing unit 12 is connected with the analog-to-digital converter 11 to facilitate the transmission of the first digital audio signal S1. The counter 13 is connected with the intermediary processing unit 12 and generates a control signal to control the intermediary processing unit 12 to only output the first digital audio signal S1 after a specific time for delay. Herein the specific delay time is based on the time required for the analog-to-digital converter 11 to operate under a stable condition from the startup. For experimental readings, it can be seen that such a specific time is approximately 2 seconds, but in practice this duration of time may vary depending on the specifications of the analog-to-digital converter 11 and the capacitance of the conjunctively used capacitor, thus this value is by no means restricted thereto.

Furthermore, the counter 13 may be a circuitry including at least one electronic element, or an alternative design as a single chip controller, and it may count the said specific time based on a reset signal and a packet identification signal received by the controlling unit 14 from the game platform 2.

In details, the reset signal is used to reset the counter 13, allowing the counter 13 to recount whenever the audio signal transmission apparatus 1 is connected once again with the game platform 2 and restart to operate. As mentioned in previous texts, the audio signal transmission apparatus 1 adopts the design of USB transmission protocol. The reset signal is preferably a USB reset command fixedly issued by the game platform 2 as long as the detection for the existence associated with USB device connection is successful, thereby assuring the reception of the USB reset command and successful recount whenever the USB device reconnected to the game platform 2. Of course, in practical designs, such a reset signal may also directly use a power on reset signal generated at startup by the hardware reset circuit in the hardware circuitry of the audio signal transmission apparatus 1. The implementation thereof can be designed in accordance with actual demands without limiting the present invention thereto.

The said packet identification signal is used as the reference for the counting frequency in the counter 13. Similarly, such a packet identification signal preferably adopts directly the Start of Frame signal regularly sent in the USB transmission protocol, which is approximately one Start of Frame signal per 1 ms, i.e., about 1 KHz after conversion into frequency. Certainly, if the counting frequency in the counter 13 actually needs not to be so high, further frequency reduction can be performed in order to fit into the actually required counting frequency, which implies no limitation to the present invention in any sense.

The controlling unit 14 is connected with the intermediary processing unit 12 and the counter 13, and used to communicate with the game platform 2 for signal transmission. Herein the controlling unit 14 provides the reset signal and the packet identification signal outputted from the game platform 2 to the counter 13 for facilitating specific time counting, and further sends the first digital audio signal S1 outputted by the intermediary processing unit 12 to the game platform 2 based on the recording command outputted by the game platform 2. Accordingly, the game platform 2 is allowed to successfully finish the recording process.

Hereunder further illustrations will be provided in terms of the circuitry architecture of the intermediary processing unit 12 in the present embodiment and actual process phases thereof. As shown in FIG. 1, the intermediary processing unit 12 further comprises: a signal generator 121 and a multiplexer 122. The signal generator 121 is used to continuously generate a second digital audio signal S2, and the second digital audio signal S2 is a default mute data signal; that is, an entirely "logical 0" signal output. The multiplexer 122 is connected with the analog-to-digital converter 11 and the signal generator 121 for receiving the first digital audio signal S1 and the second digital audio signal S2. Besides, the multiplexer 122 is also controlled by the control signal outputted by the counter 13, so as to switch to output either the second digital audio signal S2 within the specific counting time or, the first digital audio signal S1 after the specific counting time. In the way, upon the reception of recording command, the controlling unit 14 outputs the second digital audio signal S2 to the game platform 2 if it is within the specific time of counting, whereas alternatively outputs the first digital audio signal S1 to the game platform 2 if it is after the specific time of counting.

Accordingly, if the duration of time from the startup till the reception of recording command issued by the game platform 2 is less than the specific time, the audio signal transmission apparatus 1 according to the present invention in this case will first output the second digital audio signal S2, hence the first digital audio signal S1 considered as a incorrect signal due to the absence of stable state in the analog-to-digital converter 11 can not be outputted, thereby achieving the objective of noise generation avoidance.

According to the aforementioned illustration, it can be seen that, through the circuitry architecture in the intermediary processing unit 12 of the present embodiment, the intermediary processing unit 12 is allowed to ensure the output of the mute data signal within the specific time of counting, rather than the output of incorrect or interfered audio signals which may undesirably lead to the formation of noise. Certainly, the circuitry design in the intermediary processing unit 12 is by no means limited thereto, and all designs which are controllable to delay outputting the digital audio signal converted for a specific time required are to be deemed as falling within the scope claimed by the audio signal transmission apparatus 1 according to the present invention to be legally protected.

Figure 2:
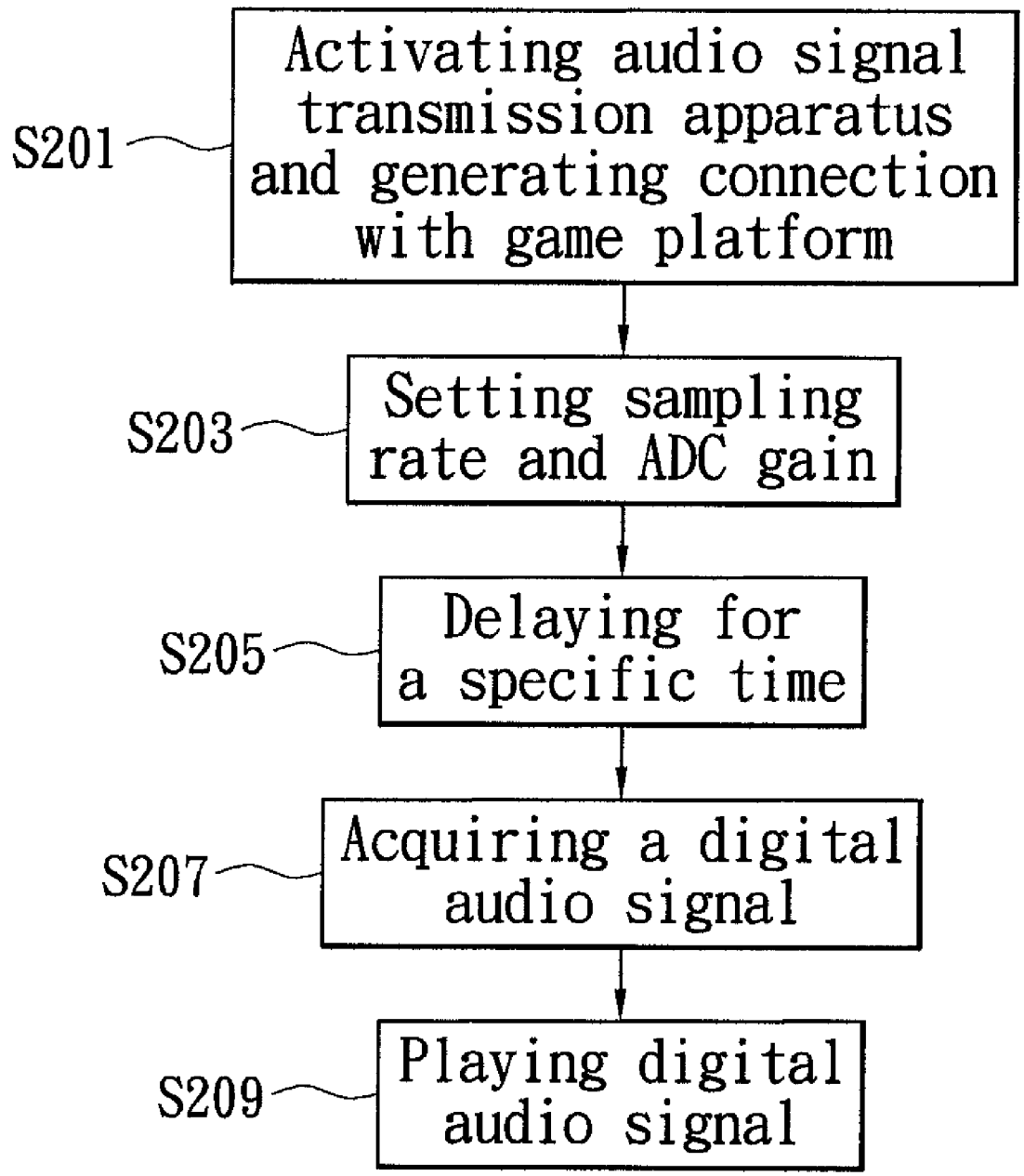
FIG. 2 is a flowchart of the method for avoiding noise generation as according to an embodiment of the present invention.

Next, the method for avoiding noise generation according to the present invention is used to prevent the noise generation due to a connection of an audio signal transmission apparatus with a game platform executing a recording process, whose implementation phases can be generally illustrated as FIG. 2, wherein a flowchart for an embodiment of the method for avoiding noise generation according to the present invention is shown. The method for avoiding noise generation according to the present embodiment comprises the following steps: initially, upon the connection of the audio signal transmission apparatus with the game platform, activating the audio signal transmission apparatus and acquiring the connection between the game platform and the audio signal transmission apparatus (S201), thereby allowing the game platform to acquire relevant information concerning the audio signal transmission apparatus; next, setting a sampling rate and an ADC gain by a game software running over the game platform based on the recording process (S203), in which any person skilled in the art can appreciate the actual functions of the sampling rate and the ADC gain before performing the recording process, and further descriptions thereof will be herein omitted for brevity.

After STEP S203, the design of the present embodiment comprises the steps of further delaying for a specific time (S205), such that the analog-to-digital converter in the audio signal transmission apparatus has sufficient time to operate under a stable condition; furthermore, after such a specific time, acquiring the digital audio signal based on a recording command currently outputted by the game platform (S207); and finally, having the game platform to play the acquired digital audio signal (S209).

Figure 3:
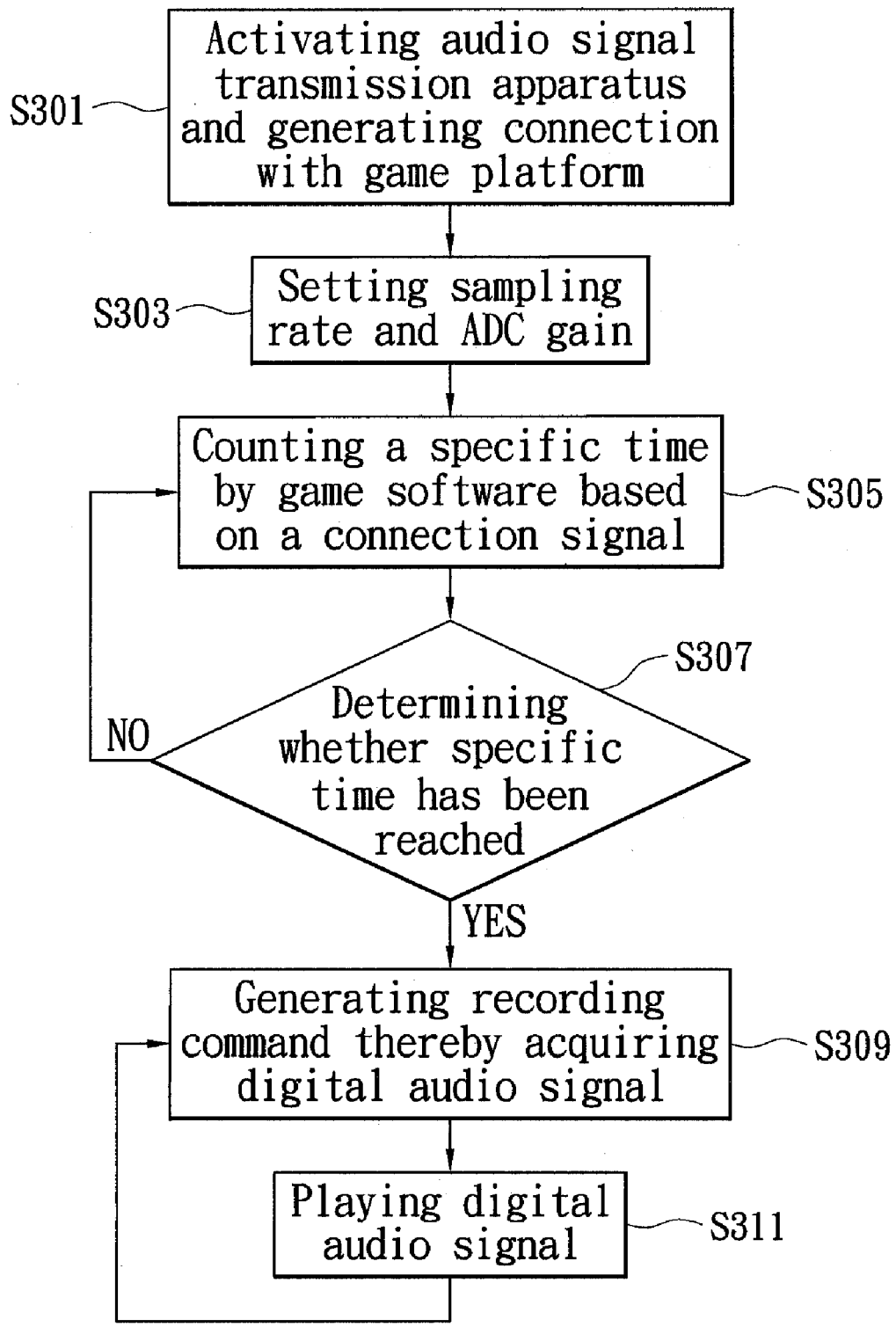
FIG. 3 is a flowchart of the method for avoiding noise generation as according to a first application embodiment of the present invention.

In accordance with the descriptions on the embodiment of the method for avoiding noise generation as above, hereunder the phases of a further different application embodiment will be set forth as exemplary illustrations. Refer now to FIG. 3, wherein a flowchart for a first application embodiment of the method for avoiding noise generation according to the present invention is shown. As shown in FIG. 3, the method for avoiding noise generation according to the present invention comprises the following steps: initially, upon the connection of the audio signal transmission apparatus with the game platform, similarly activating the audio signal transmission apparatus and acquiring the connection between the game platform and the audio signal transmission apparatus (S301), and setting a sampling rate and an ADC gain by a game software running over the game platform based on the recording process (S303).

After STEP S303, the present embodiment performs the step of, by means of the design in the game software, allowing the game software to start counting the specific time in accordance with a connection signal generated after the connection of the game platform and the audio signal transmission apparatus (S305); then further determining whether the counted specific time has been reached (S307); if the result of determination is negative in STEP S307, indicating that it has not yet counted to the specific time, repeating to STEP S305 to continue the counting process; contrarily, in case the determination in STEP S307 is positive, indicating the specific time has been counted, thus generating a recording command by the game software based on the required recording process and transferring to the audio signal transmission apparatus, thereby converting an analog audio signal by means of the audio signal transmission apparatus and acquiring the digital audio signal (S309).

In the way, since the recording command is issued by the game software after being delayed for the specific time, the audio signal transmission apparatus will not receive any recording command to undergo the digital audio signal conversion within the specific time (in which the analog-to-digital converter in the audio signal transmission apparatus has not yet reached its stable condition); rather, the recording command can be received only after the specific time, thus enabling conversion and output of the digital audio signal to the game platform.

At last, the method continues the steps of allowing the game platform to play the digital audio signal (S311); afterward, repeating the STEP S309 and STEP S311, thereby allowing the game platform to consistently generate recording commands to acquire further digital audio signals and to play correct digital audio signals, until the recording process in the game software is terminated or else the disconnection between the audio signal transmission apparatus and the game platform occurs.

Figure 4:
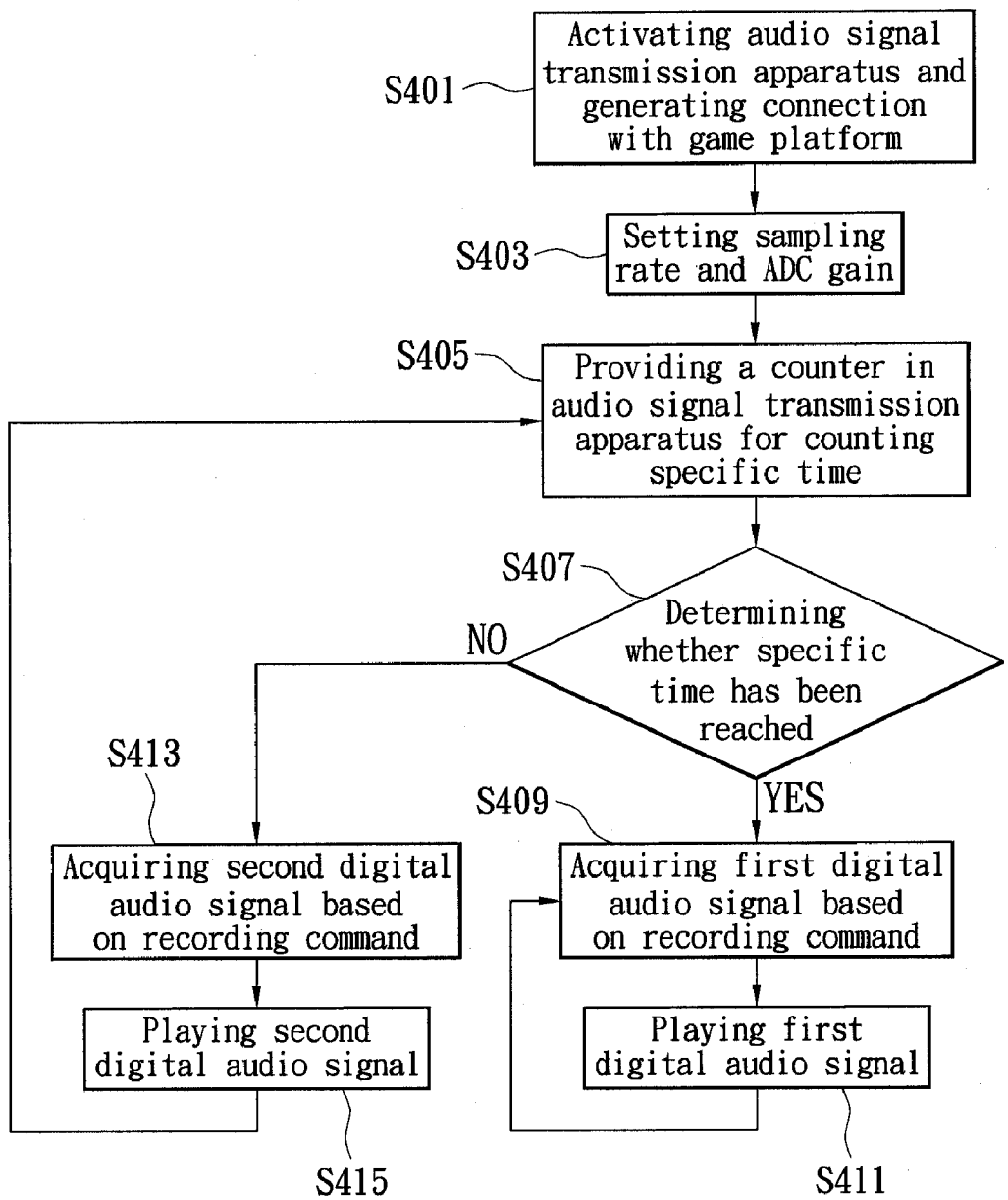
FIG. 4 is a flowchart of the method for avoiding noise generation as according to a second application embodiment of the present invention.

Additionally refer to FIG. 4, wherein a flowchart for a second application embodiment of the method for avoiding noise generation according to the present invention is shown. The method for avoiding noise generation according to the present embodiment comprises the following steps: initially, upon the connection of the audio signal transmission apparatus with the game platform, similarly activating the audio signal transmission apparatus and acquiring the connection between the game platform and the audio signal transmission apparatus (S401), and setting a sampling rate and an ADC gain by a game software running over the game platform based on the recording process (S403).

After STEP S403, the present embodiment comprises a step of providing a counter in the audio signal transmission apparatus for counting a specific time based on a reset signal and a packet identification signal outputted by the game platform (S405); then further determining whether the specific time has been reached (S407). It is to be noted that since the initialization process in the game software is less complicated, so during the period of the specific time of counting, the game software is actually well prepared for recording command output.

Suppose the determination in STEP S407 is positive, indicating the counter has counted the specific time, thus the method performs the step of acquiring a first digital audio signal by the audio signal transmission apparatus based on the currently received recording command (S409); herein the first digital audio signal is generated through the conversion of the analog audio signal received by the audio signal transmission apparatus, i.e., the sound actually intended to be recorded; afterward, playing the first digital audio signal by the game platform (S411), and then repeating the STEP S409 and STEP S411, until the recording process in the game software is terminated or else the disconnection between the audio signal transmission apparatus and the game platform occurs.

Alternatively, in case the determination in STEP S407 is negative, indicating the counter has not yet counted the specific time, and suppose a recording command generated by the game software is received at the time point, the method performs the step of acquiring a second digital audio signal by the audio signal transmission apparatus in accordance with the recording command (S413), in which the second digital audio signal is a mute data signal provided by the audio signal transmission apparatus in default; afterward, playing the second digital audio signal, that is, playing the mute data signal, by the game platform (S415), and then repeating the STEP S405 and other subsequent steps after the execution of STEP S415.

As above, the illustrations for two application embodiments of the method for avoiding noise generation have been provided.

In summary of the previous texts, the present invention needs not to significantly increase manufacture costs to eliminate the noise problem due to inconsistency of execution time sequences in software and hardware incorporated on the game platform, thereby allowing the audio signal transmission apparatus, connected with the game platform, to successfully output the audio signal converted by the analog-to-digital converter under a stable state, so as to effectively achieve the objective for avoidance of noise generation.

The aforementioned disclosures are set forth only to illustrate the detailed descriptions and appended drawings of the embodiments according to the present invention, rather than for the purpose of limiting the present invention thereto. The complete scope of the present invention should based on the following claims, and all changes or modifications that skilled ones in the art can conveniently consider without departing from the present invention should be deemed as being encompassed within the scope of the present invention delineated by the following claims.

What is claimed is:

1. An audio signal transmission apparatus avoiding noise generation, which the apparatus being applied to a game platform executing a recording process, said audio signal transmission apparatus comprising:

an analog-to-digital converter, which receives an analog audio signal and converts the analog audio signal to a first digital audio signal;

an intermediary processing unit, which is connected with the analog-to-digital converter for transmitting the first digital audio signal;

a counter, which is connected with the intermediary processing unit and generates a control signal to output the first digital audio signal after counting a specific time for delay, wherein the specific time counted by the counter is based on a reset signal and a packet identification signal received by the controlling unit from the output of the game platform, and the specific time is the time required from the startup of the audio signal transmission apparatus to operation under a stable state; and a controlling unit, which is connected with the counter and the intermediary processing unit, and used for transmitting the first digital audio signal to the game platform.

2. The audio signal transmission apparatus avoiding noise generation according to claim 1, wherein the intermediary processing unit further comprises:

a signal generator, which is used to generate a second digital audio signal; and a multiplexer, which is connected with the analog-to-digital converter and the signal generator and used to receive the first digital audio signal and the second digital audio signal;

wherein the multiplexer is used to output either the second digital audio signal or the first digital audio signal respectively within or after the specific time associated with the control signal.

3. The audio signal transmission apparatus avoiding noise generation according to claim 2, wherein the second digital audio signal is a mute data signal.

4. The audio signal transmission apparatus avoiding noise generation according to claim 3, wherein the controlling unit transfers the first digital audio signal or the second digital audio signal to the game platform based on a recording command.

5. The audio signal transmission apparatus avoiding noise generation according to claim 4, wherein the recording command is generated by a game software executing on the game platform.

6. The audio signal transmission apparatus avoiding noise generation according to claim 1, wherein the controlling unit transfers the signal to the game platform through a serial transmission protocol.

7. The audio signal transmission apparatus avoiding noise generation according to claim 1, wherein the analog-to-digital converter is further connected with an audio input device so as to receive the analog audio signal generated by the audio input device.

8. The audio signal transmission apparatus avoiding noise generation according to claim 1, wherein the counter further includes at least one electronic element or a single chip controller.

9. An audio signal transmission apparatus avoiding noise generation, which the apparatus being applied to a game platform executing a recording process, said audio signal transmission apparatus comprising:

an analog-to-digital converter, which receives an analog audio signal and converts the analog audio signal to a first digital audio signal;

an intermediary processing unit, which is connected with the analog-to-digital converter for transmitting the first digital audio signal;

a counter, which is connected with the intermediary processing unit and generates a control signal to output the first digital audio signal after counting a specific time for delay;

a controlling unit, which is connected with the counter and the intermediary processing unit, and used for transmitting the first digital audio signal to the game platform:
  a signal generator, which is used to generate a second digital audio signal; and
  a multiplexer, which is connected with the analog-to-digital converter and the signal generator for receiving the first digital audio signal and the second digital audio signal;
  wherein the multiplexer is used to output either the second digital audio signal or the first digital audio signal corresponding within or after the specific time associated with the control signal.

10. The audio signal transmission apparatus avoiding noise generation according to claim 9, wherein the second digital audio signal is a mute data signal.

11. A method for avoiding noise generation used to prevent the generation of noise when an audio signal transmission apparatus is connected with a game platform executing a recording process, said method comprising the following steps:
  activating the audio signal transmission apparatus, and acquiring the connection between the game platform and the audio signal transmission apparatus;
  delaying for a specific time and further acquiring a digital audio signal in accordance with a recording command
  counting the specific time by a game software based on a connection signal generated after acquiring the connection; and
  generating the recording command based on the recording process so as to acquire the digital audio signal while the game software determines the specific time has been reached.

12. The method for avoiding noise generation according to claim 11, wherein the specific time is the time required from the startup of the audio signal transmission apparatus to the operation thereof under a stable state.

13. The method for avoiding noise generation according to claim 12, wherein after the acquisition of the connection between the game platform and the audio signal transmission apparatus, the steps of the method further comprising:
  setting a sampling rate and an ADC gain by a game software running on the game platform based on the recording process.

14. The method for avoiding noise generation according to claim 13, wherein after the acquisition of the digital audio signal, the steps of the method further comprising:
  playing the digital audio signal.

15. The method for avoiding noise generation according to claim 14, further comprising the following steps:
  providing a counter in the audio signal transmission apparatus, thereby counting the specific time based on a reset signal and a packet identification signal outputted by the game platform; and
  acquiring either a first digital audio signal or a second digital audio signal associated with the recording command generated by the game software as the counter determines that the specific time has been reached or not, respectively.

16. The method for avoiding noise generation according to claim 15, wherein the first digital audio signal is converted from an analog audio signal received by the audio signal transmission apparatus, and the second digital audio signal is a mute data signal provided by the audio signal transmission apparatus in default.

17. The method for avoiding noise generation according to claim 11, wherein the digital audio signal is converted from an analog audio signal received by the audio signal transmission apparatus.

18. A method for avoiding noise generation used to prevent the generation of noise when an audio signal transmission apparatus is connected with a game platform executing a recording process, said method comprising the following steps:
  activating the audio signal transmission apparatus, and acquiring the connection between the game platform and the audio signal transmission apparatus;
  delaying for a specific time and further acquiring a digital audio signal in accordance with a recording command;
  providing a counter in the audio signal transmission apparatus, thereby counting the specific time based on a reset signal and a packet identification signal outputted by the game platform; and
  acquiring a first digital audio signal or a second digital audio signal based on the recording command generated by the game software as the counter determines that the specific time has been reached or not, respectively.

19. The method for avoiding noise generation according to claim 18, wherein the first digital audio signal is converted from an analog audio signal received by the audio signal transmission apparatus, and the second digital audio signal is a mute data signal provided by the audio signal transmission apparatus in default.

* * * * *